Figure 1:
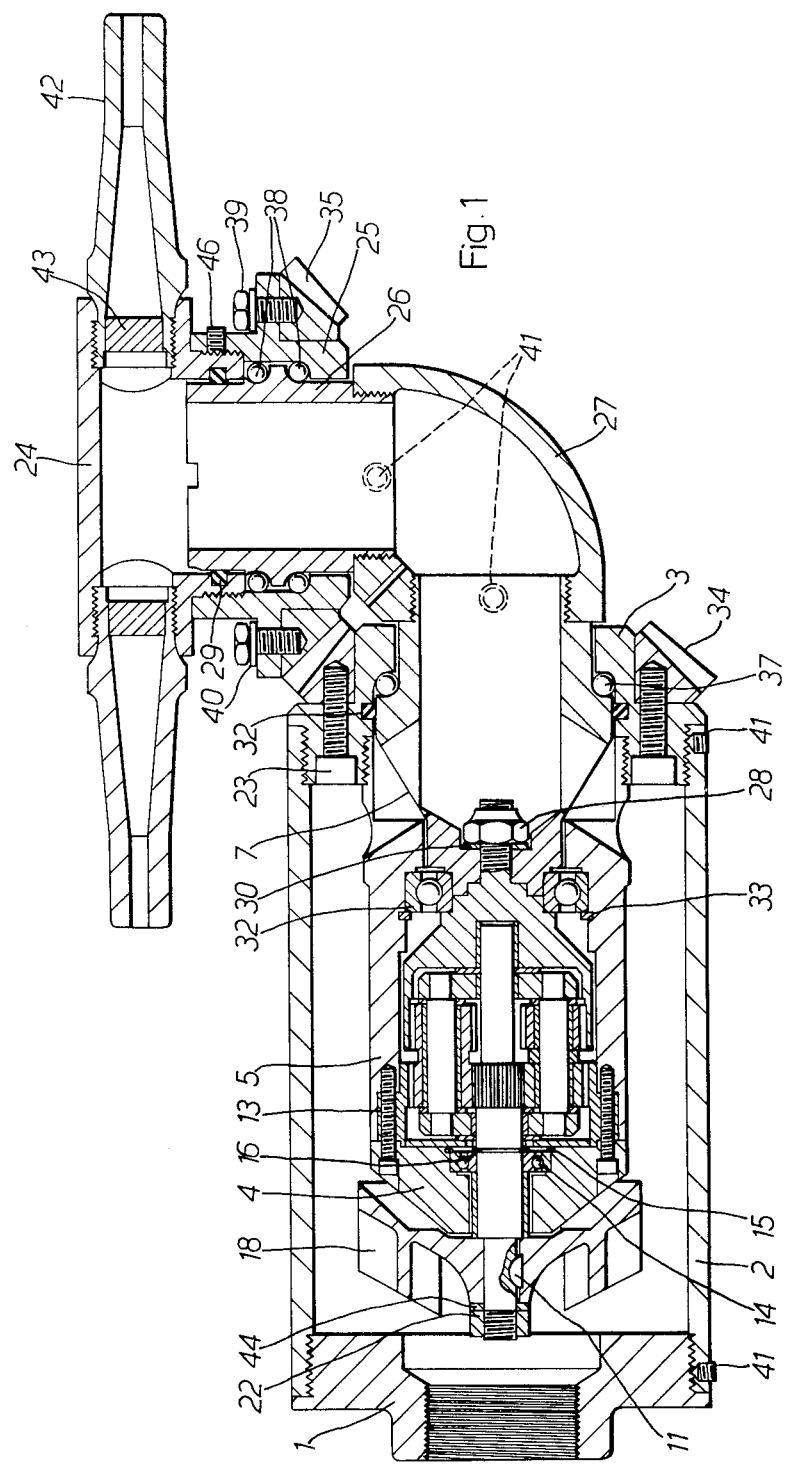

United States Patent [19]

Wellings

[11] 4,244,524
[45] Jan. 13, 1981

[54] EPICYCLIC NOZZLE DRIVE, AN ORBITAL NOZZLE UNIT AND A HYDRAULIC CLEANING HEAD INCORPORATING THE SAME

[75] Inventor: Ronald H. Wellings, Flackwell Heath, England

[73] Assignee: Purex Engineering Services, Maidenhead, England

[21] Appl. No.: 30,572

[22] Filed: Apr. 16, 1979

[30] Foreign Application Priority Data

Apr. 18, 1978 [GB] United Kingdom ............... 15327/78

[51] Int. Cl.³ .............................................. B05B 3/04
[52] U.S. Cl. ................. 239/227; 134/167 R; 134/181; 239/240; 239/DIG. 19
[58] Field of Search ....... 239/227, 240, 241, DIG. 19; 134/166 C, 167 R, 167 C, 168 R, 172, 174, 181

[56] References Cited

U.S. PATENT DOCUMENTS

| | | | |
|---|---|---|---|
| 3,464,632 | 9/1969 | Bristow | 239/227 |
| 3,544,012 | 12/1970 | McNally | 239/240 X |

FOREIGN PATENT DOCUMENTS

1287105  8/1972  United Kingdom ............... 134/167 R

*Primary Examiner*—Andres Kashnikow
*Attorney, Agent, or Firm*—Sughrue, Rothwell, Mion, Zinn and Macpeak

[57] ABSTRACT

There is provided a drive for an orbital nozzle comprising a housing having a fluid inlet and containing a fluid driveable impeller from which the fluid, in use of the drive, flows through a passage within the housing, an epicyclic rotary speed reducing mechanism in the housing, an output shaft driven by the epicyclic at speed reduced below the impeller speed, an element driveable by the output shaft mounting the nozzle for rotation, including an element for delivering fluid from the passage to the nozzle, as well as an orbital nozzle unit which incorporates such a drive and a hydraulic cleaning head which incorporates such a drive or orbital nozzle unit.

2 Claims, 4 Drawing Figures

EPICYCLIC NOZZLE DRIVE, AN ORBITAL NOZZLE UNIT AND A HYDRAULIC CLEANING HEAD INCORPORATING THE SAME

This invention relates to an epicyclic nozzle drive, primarily intended for obtaining the high ratio rotation speed reduction which is necessary for tank cleaning equipment, as well as to an orbital nozzle unit incorporating such a nozzle drive.

The Sellers Jumbo Model 215 S is the result of over fifty years of experience and modern technology in the United States of America, combined to meet the needs of modern-day industrial cleaning problems. It has a positive drive, powered hydraulically by the high velocity of the cleaning fluid rotating an impeller, which, via a speed reduction device, gives the nozzle head a slow rotation speed that results in long reaching jet streams of maximum impact. This machine is manufactured throughout from type 316 stainless steel with Viton or Teflon 'O' rings with the exception of the speed reduction device, which in the current design comprises a Harmonic Drive System, as described in detail in British Pat. No. 1,477,562 and corresponding U.S. Pat. No. 3,902,670. The words "Viton" and "Teflon" are Trade Marks, as is "Sellers".

The harmonic drive gives an in-line input/output transmission developing a reduction ratio of about 160:1 but uses a flexible output gear with very fine teeth, aproximately 150 D.P., and is made from heat treated alloy steel. It is, therefore, necessary to pre-lubricate the unit and completely seal it within a pod to isolate it from the cleaning fluid, which would cause rust and corrosion.

The sealing of the pod has in certain cases presented difficulties because the seals have to withstand the cleaning fluid pressure, often up to 300 p.s.i., and work with low frictional resistance on rotating shafts.

To overcome this design difficulty and to ensure that there would be no corrosion that might cause contamination when used for cleaning plants in the food and allied industries, the present invention has been developed, not only as a modification of Sellers Jumbo Model 215 S, but also for other types, such as Model Jumbo 6, whether related thereto or not.

According to the present invention, there is provided a drive for an orbital nozzle comprising a housing having a fluid inlet and containing a fluid driveable impeller from which the fluid, in use of the drive, flows through a passage within the housing, an epicyclic rotary speed reducing mechanism in the housing, an output shaft driven by the epicyclic at a speed reduced below the impeller speed, a means driveable by the output shaft mounting the nozzle for rotation, including means for delivering fluid from the passage to the nozzle.

Of course, the epicyclic will generally be manufactured from 316 stainless steel with non-corrosive plastics material bearing bushes which eliminate the necessity of sealing, as the cleaning fluid is used to dissipate the grictional heat generated in the gears and bearings. Other suitable bearings can obviously be used.

The rotation is transmitted from the sun gear via a double planet gear, of which one gear meshes with a stationary ring gear, whilst the other meshes with the output ring gear. Two pairs of idling planet gears are also fitted at equal spacing. These gears are used to equilibrate the unit and counteract the bending moment applied to the centre shaft from the driving double planet gear. The two sets of planet gears are allowed to idle to facilitate meshing on assembly.

The epicyclic gearing develops a high reduction ratio. The sun gear drives the primary planet gear which being in mesh with a stationary ring gear rotates around the sun gear and also about itself. During one complete revolution about the sun gear, the planet gear must rotate about itself 57/21 times and to generate this rotation the sun gear must rotate (57/21×21/15) times, plus one revolution to drive the planet gear around itself. The reduction ratio between the sun gear and the rotation of the planets around it is, therefore, (57/15+1). The configuration of the gears is such that the direction of rotation of the planets about themselves is opposite to that of the sun but the direction of rotation of the planets around the sun is the same as that of the sun. Under these conditions, the secondary planet gear presents to the output ring gear one complete revolution being equivalent to 56−(57/21×20), thus producing the secondary reduction gear ratio of $$\frac{56}{56 - \left(\frac{57 \times 20}{21}\right)}.$$

The compound of these two ratios is thus the reduction ratio, namely 156.8, which is compatible with the ratio of the harmonic drive unit described in the aforementioned Patent Application and published United States Patent.

It will be appreciated that by replacing the harmonic drive with an epicyclic gear unit enables all corrosive materials to now be eliminated from the machine, thus making it acceptable to the food and allied industries. Furthermore, the epicyclic gear unit is of a more robust, serviceable and economic design and furthermore the epicyclic gear unit can be designed so as to be interchangeable with the harmonic drive within a cleaning machine, thus enabling the existing machines to be updated.

Figure 2:
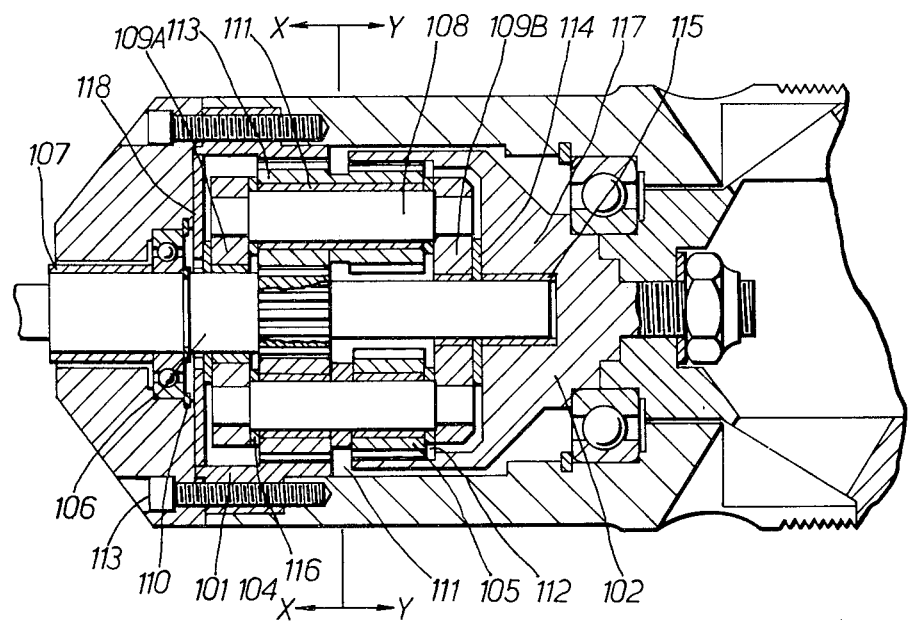
Figure 3A:
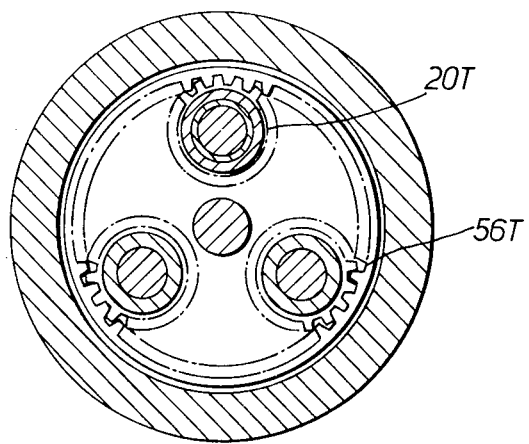
Figure 3B:
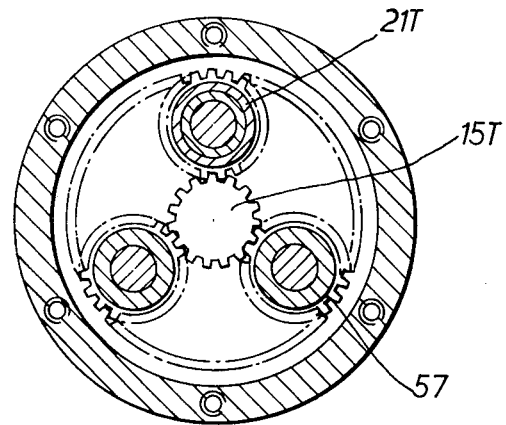

For a better understanding of the present invention, reference will now be made to the accompanying drawings, in which:

FIG. 1 shows a cross-sectional view of a nozzle in accordance with the invention incorporating an epicyclic gear unit, FIG. 2 shows a cross-section of the gear unit itself, and FIGS. 3a and 3b show a section in each direction from the line XY—XY of FIG. 2.

Referring to FIG. 1, an outer body 2 is provided with an end cap 1 and a bottom cap 3, with a cover 4 being provided for body 5 of the epicyclic gear unit, on which inside body is provided a lower vertical shaft 7 to which is fastened an elbow unit 27 to which is attached a horizontal tube 26, connected by diagrammatically shown allen screws 41. About the horizontal tube is rotatedly mounted a nozzle body adaptor 25 with bearing 29 and ball bearings 38 therebetween. Mounted on the nozzle body adaptor 25, by means of allen screw 46 is a nozzle body 24 provided with nozzles 42 incorporating stream straighteners 43. About the bottom cap 3 there is provided a bevel gear 34 with 45 teeth and intermeshing therewith there is provided about the nozzle body adaptor 25 a bevel gear 35 with 44 teeth. A bearing 32 is provided between the bottom cap 3 and the lower vertical shaft 7. At the end of the epicyclic gear unit remote from the lower vertical shaft 7 there is provided an impeller 18 mounted on the epicyclic gear unit by a half nut 22 and a lockwasher 44. The impeller is provided with a woodruff key 11. The cover 4 is fastened to the inside body 5 by screws 13. At the other end of the epicyclic gear unit, bearing 32 and retaining ring 33 is provided and the unit held together at the lower end via a flat washer 30 and a flexloc nut 28. At the other end of the epicyclic gear unit there is provided a bearing 14 held between retaining rings 15 and 16. The word "Flexloc" is a Trade Mark.

The bearing 32 is mounted to the outer body 2 by screws 23, with ball bearings 37 being provided in addition to the bearing 32. Similarly, the bevel gear 35 is mounted on the nozzle body adaptor 25 by screws 39 and lockwashers 40, with the ball bearings 38 and the bearing 29 being provided between the nozzle body adaptor 25 and the horizontal tube 26.

It should be noted that the device described in connection with FIG. 1 is essentially that shown in British Pat. No. 1,477,562 and U.S. Pat. No. 3,902,670, except that the present device is provided with an epicyclic gear unit as opposed to a harmonic drive unit.

Turning now to FIGS. 2 and 3 of the drawings, the epicyclic gear unit will be described in more detail. At the top end of the epicyclic gear unit there is provided an outer ring gear 101 and at the bottom end an output ring gear 102. The gear train therebetween comprises a double planet gear 103, two single planet gears 104 and two single planet gears 105, the gearing being mounted about an upper vertical shaft 106 having a bush 107 thereabouts at the upper end. Gear pins 108 (3) are provided between yoke plates 109A and 109B. In accordance with the usual practice, the epicyclic gear unit further comprises a washer 110, a planet gear bush 111, four planet gear bushes 112, a yoke plate bush 113, a yoke plate bush 114, a shaft bush 115, six planet gear washers 116, two shaft washers 117 and 118 and two spacer washers 119.

The actual function of the epicyclic gear unit has been described hereinbefore. However, referring to FIGS. 3a and 3b it will be seen that the sun gear (15 teeth) drives the primary planet gear (21 teeth) which being in mesh with the stationary ring gear (57 teeth) rotates around the sun gear and also about itself.

I claim:

1. A drive for an orbital nozzle, comprising a housing having a fluid inlet, a fluid driven impeller disposed proximate to said inlet, a fluid passage within the housing extending from said inlet to an outlet, an epicyclic rotary speed reducing gear unit within said housing, said gear unit having an input formed by said impeller, an output shaft driven by the gear unit at a speed reduced below the speed of said impeller, means driveable by said output shaft and mounting the nozzle for rotation, including means for delivering fluid from said outlet of said passage to said nozzle, and wherein said gear unit is made of stainless steel and is provided with non-corrosive plastic bearing bushes, and wherein said passage surrounds said gear unit such that fluid flowing through said passage acts to dissipate frictional heat generated in the gear unit.

2. A drive according to claim 1, wherein the epicyclic gear unit comprises a sun gear, a double planet gear, a stationary ring gear and an output ring gear, with one gear of the double planet gear meshing with the stationary ring gear and the other meshing with the output ring gear, two pairs of idling planet gears being fitted at equal spacing.

* * * * *